United States Patent
Deen et al.

(10) Patent No.: US 7,215,777 B2
(45) Date of Patent: May 8, 2007

(54) SENDING NOTIFICATION THROUGH A FIREWALL OVER A COMPUTER NETWORK

(75) Inventors: Brian J. Deen, North Bend, WA (US);
Alex I. Hopmann, Seattle, WA (US);
Joel M. Soderberg, West Edmonds, WA (US); Sean O. Lyndersay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 09/761,374

(22) Filed: Jan. 16, 2001

(65) Prior Publication Data

US 2002/0095600 A1 Jul. 18, 2002

(51) Int. Cl.
*H04K 1/00* (2006.01)

(52) U.S. Cl. .................. 380/270; 380/271; 713/152; 709/219

(58) Field of Classification Search ........ 710/200–201, 710/152, 181; 380/270–271; 709/219, 228; 713/152
See application file for complete search history.

(56) References Cited

U.S. PATENT DOCUMENTS

| | | | | |
|---|---|---|---|---|
| 5,326,027 A * | 7/1994 | Sulfstede | ................. | 236/51 |
| 5,703,929 A * | 12/1997 | Schillaci et al. | ............. | 379/21 |
| 6,076,114 A * | 6/2000 | Wesley | ................. | 709/235 |
| 6,334,056 B1 * | 12/2001 | Holmes et al. | ............. | 455/445 |
| 6,643,355 B1 * | 11/2003 | Tsumpes | ................. | 379/45 |
| 6,697,415 B1 * | 2/2004 | Mahany | ................. | 375/130 |
| 6,697,849 B1 * | 2/2004 | Carlson | ................. | 709/219 |
| 6,704,786 B1 * | 3/2004 | Gupta et al. | ............. | 709/228 |

(Continued)

OTHER PUBLICATIONS

Cohen, J. and Aggarwal, S., "General Event Notification Architecture Base", Jul. 9, 1998, pp. 1-12, www.ietf.org/proceedings/98dec/I-D/draft-cohen-gena-p-base-01.txt.
Barnes, P, "Implementation of Observer Pattern", Jul. 2000, pp. 50, 52, 54, *C/C++Users Journal*, www.cuj.com.

(Continued)

*Primary Examiner*—Kambiz Zand
*Assistant Examiner*—Tongoc Tran
(74) *Attorney, Agent, or Firm*—Workman Nydegger

(57) ABSTRACT

Methods and systems for efficiently sending notification of the occurrence of events through a firewall. A client system operating inside a firewall, attempts to receive notification of the occurrence of events from a server system operating outside the firewall. The client system attempts to receive communication from the server system using a connectionless protocol, such as UDP. If the client system receives communication using the connectionless protocol, the client system requests notification be sent using the connectionless protocol. The server system notifies the client system by sending a packet to the server system, using the connectionless protocol, when events occur. However, if the client does not receive communication using the connectionless protocol, the client requests notifications be sent using a connection-oriented protocol, such as TCP. If the client system requests notification using a connection-oriented protocol, the client system polls the server system to receive notification of the occurrence of events.

23 Claims, 3 Drawing Sheets

U.S. PATENT DOCUMENTS

| | | | | |
|---|---|---|---|---|
| 6,763,384 B1* | 7/2004 | Gupta et al. | ............... | 709/224 |
| 6,804,707 B1* | 10/2004 | Ronning | ................... | 709/220 |
| 6,829,478 B1* | 12/2004 | Layton et al. | ............ | 455/428 |
| 6,934,955 B2* | 8/2005 | Nickum | .................... | 719/318 |
| 2001/0003828 A1* | 6/2001 | Peterson et al. | .......... | 709/219 |

OTHER PUBLICATIONS

Subramaniam, K., Kothari, S., and Heller, D., "A Communication Library Using Active Messages to Improve Performance of PVM", 1996, pp. 146-152, *Journal of Parallel and Distributed Computing vol. 39*, Article 0162.

* cited by examiner

SENDING NOTIFICATION THROUGH A FIREWALL OVER A COMPUTER NETWORK

BACKGROUND OF THE INVENTION

1. The Field of the Invention

The present invention relates to methods and systems for sending event notification. More specifically, the present invention relates to methods and systems for determining an appropriate protocol to use when notifying a client computer inside a firewall of events that occur outside the firewall.

2. The Prior State of the Art

The popularity of the Internet has profoundly improved the way people communicate by allowing users quick and easy access to information. By accessing the World Wide Web and electronic mail through computers and other devices, people now stay in touch with each other around the globe, and can access information on a virtually limitless variety of subjects.

However, transmitting and storing information on the Internet raises various security issues. Any device using the Internet to store or transfer information is vulnerable to attack from all other devices on the Internet. As a result, many entities want the advantages of the Internet while still protecting their data and devices from attack. To meet the need for security on the Internet, a variety of products have been developed.

One product in particular is the "firewall." Firewalls are used to monitor communication between computer networks. If a firewall detects communication that communication over the Internet. In operation, a private network sits "inside" the firewall. When communication that might pose a security risk to the private network is detected from a device "outside" the firewall, for example from the Internet, the communication is blocked.

Firewalls are therefore advantageous for shielding a private network from harmful communication originating on the Internet. Firewalls can be configured to block communication based on various criteria, including content of the communication and originating address of the communication. It may also be the case that a firewall is configured to block content depending on the protocol that is used. For instance, when using a connection-oriented protocol (like TCP), the firewall is configured to communicate with clients "inside" the firewall that plan on sending data to, and receiving data from, a machine "outside" the firewall. In this instance, the firewall acts more like a proxy server, where the firewall establishes a connection with an outside server, on behalf of the client machine, while protecting the identity of the internal machine from the external server. However, when using a connectionless-protocol (like UDP) this security functionality is disabled. Thus, many private networks use firewalls to block communication using connectionless protocols in order to protect the private network.

However, a disadvantage of using firewalls to block communication is that firewalls may inadvertently block useful communication, such as notification of the occurrence of events, from entering onto a private network. For instance, a firewall configured to block communications using a certain protocol will block all communication using that protocol. It may be the case, that a device "outside" the firewall legitimately needs to send communications to a device "inside" the firewall.

For example, in the context of event notification, the "outside" device may be monitoring for the occurrence of an event that the "inside" device requested notification of. If the monitored event occurs, the "outside" device may attempt to notify the "inside" device of the occurrence. If a firewall blocks the protocol used by the "outside" device to send the notification, the "inside" device is prevented from receiving the notification. However, the "outside" device is unaware that the firewall is configured to blocked the protocol and thus will continue to send notifications using the blocked protocol.

It is important with the ever-increasing number of users sending and receiving data to devices on the Internet, that a device "inside" a firewall receives notification of the occurrence of an event "outside" the firewall and that the notification is done as efficiently as possible. Accordingly, methods and systems are desired for more efficiently notifying devices "inside" a firewall of the occurrence of events "outside" the firewall.

SUMMARY OF THE INVENTION

The present invention relates to methods and systems for a client system inside a firewall to determine whether a server system outside the firewall can notify the client system of the occurrence of events. The client system and server system attempt to communicate using different protocols, until a protocol the firewall does not block is selected and the server system can contact the client system. Once contact is made, the characteristics of the selected protocol are utilized to send notifications to the client system in an efficient manner.

When a server system outside a firewall needs to notify a client system inside the firewall of the occurrence of an event, it would often be of benefit to ensure notification will take place and will be performed in an efficient manner. Therefore, when it is determined that a server system outside a firewall may have to notify the client system inside the firewall of the occurrence of an event, the determination is followed by the client system performing a series of acts, which ensure the client system will be efficiently notified using a protocol the firewall does not block In absence of these acts, the client system may receive notification of the occurrence of the event in an inefficient manner or may never receive notification at all.

In operation, when a server system may have to notify a client system of the occurrence of an event, the client system determines the most efficient protocol to use to receive notifications. The client system first requests a UDP packet from the server system. If the client system receives a UDP packet from the server system in response to the request, the client system concludes that the server system is capable of notifying the client system on the occurrence of events using UDP. However, if the client system does not receive a return UDP packet, the client system concludes the server system is unable to notify the client system of the occurrence of events using UDP.

If communication using UDP failed, the client system would then rely on TCP to receive event notifications from the server system. Due to the overhead associated with using connection-oriented protocols, such as TCP, the client system would request that the server system store data on the occurrence of events. The client system would then establish a TCP connection to the server system at certain intervals and poll the server system to see if any events occurred.

There is a twofold benefit to the current invention. First, the client system determines the most efficient protocol it can use to receive notifications. The client system first attempts to use UDP for receiving notifications. Since UDP is a connectionless protocol, it requires less bandwidth and processor resources to transmit and receive data. Only if the client system cannot receive communication using UDP does it then attempt communication using the connection oriented TCP.

Second, upon selecting one of the protocols, either UDP or TCP, the invention uses an efficient manner to receive notification based on the characteristics of the selected protocol. When using UDP, the client system simply waits to receive a UDP packet including the notification information. Since UDP is a connectionless protocol, having the server system send a UDP packet, even repeatedly, when an event occurs uses minimal Internet bandwidth and processor resources. On the other hand, the server system repeatedly sending notification to the client system using the connection-oriented TCP would consume significantly more Internet bandwidth and processor resources. As a result, the notifications are stored so the client system can poll at certain intervals and retrieve notification of the occurred events.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
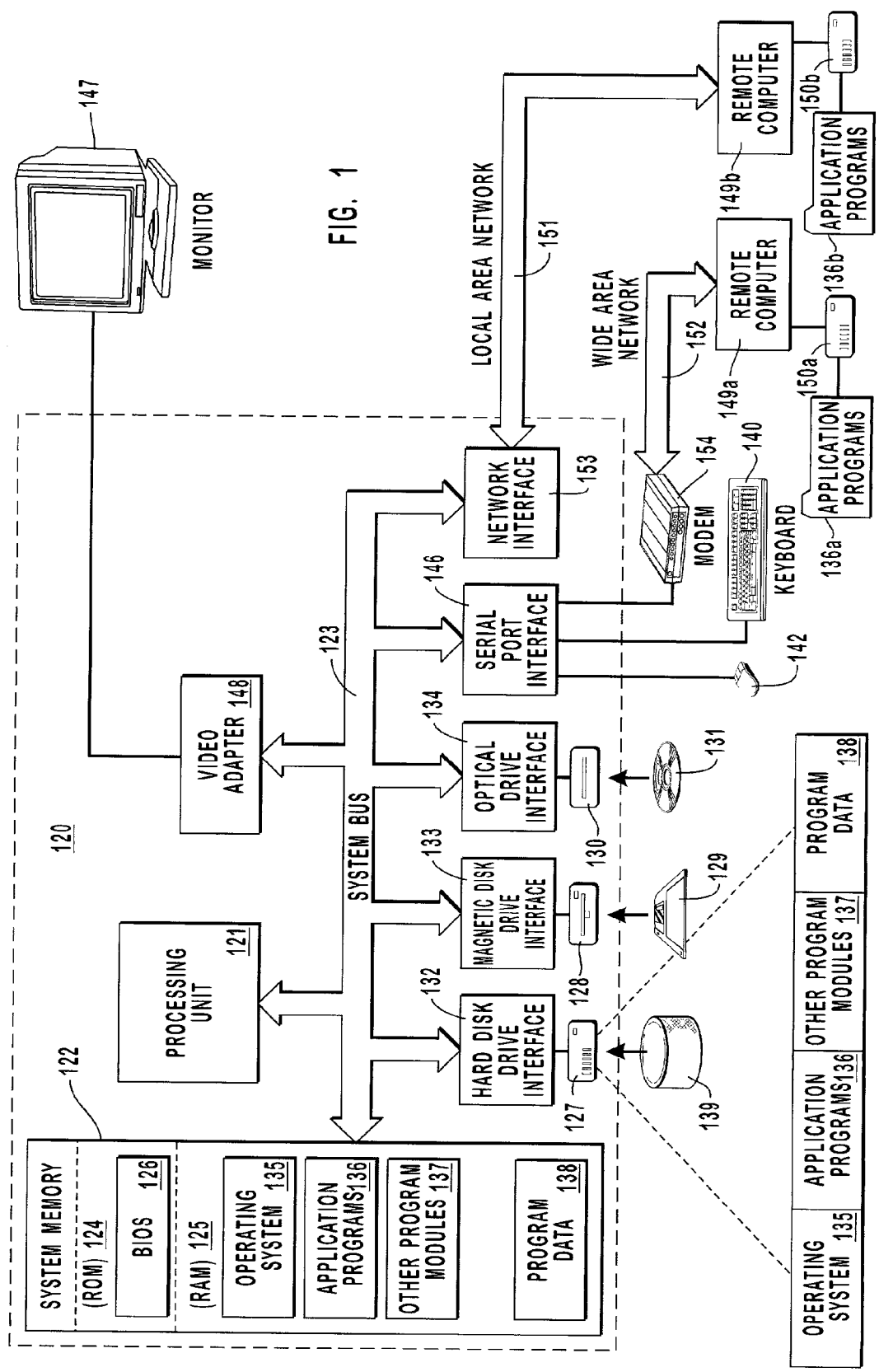
FIG. 1 illustrates an exemplary system that provides a suitable operating environment for the present invention.

The present invention extends to both methods and systems for sending notification of the occurrence of events over a computer network where security devices on the network may block the transmission of notification data. The computer network includes at least one server system, one client system, and a communications link. The server system monitors events and the client system receives notification data associated with the occurrence of events. The notification data is received in a manner that prevents intermediate security devices from blocking the notification data's transmission. The embodiments of the present invention may comprise a special purpose or general-purpose computer including various computer hardware, as discussed in greater detail below.

The term "connectionless protocol" refers to protocols where a session is not established between two network devices before data transmission begins. Thus, there is no guarantee that the packets will get to the destination in the order they that were sent, or even at all. By way of example, and not limitation, User Datagram Protocol ("UDP") is a connectionless protocol.

In contrast, the term "connection-oriented protocol" refers to protocols where a session is established between two network devices before data transmission begins. Connection-oriented protocols often facilitate verification of the correct delivery of data between two network devices. Intermediate networks between the data's source and destination can cause data to be lost or out of order. Connection-oriented protocols correct transmission errors or lost data by detecting such errors or lost data and triggering retransmission until the data is correctly and completely received. Connection-oriented protocols also facilitate the correct reassembly of data packets even if the data packets have arrived out of order. By way of example, and not limitation, Transmission Control Protocol ("TCP") is a connection-oriented protocol.

The term "firewall" refers to a system designed to prevent unauthorized access to or from a private network. Firewalls can be implemented in hardware, software, or a combination of both. Firewalls are frequently used to prevent unauthorized Internet users from accessing private networks connected to the Internet. All messages entering or leaving the private network pass through the firewall, which examines each message and blocks those that do not meet the specified security criteria. A device that is "inside" a firewall is a device on the private network the firewall is preventing unauthorized access to. A device that is "outside" a firewall is on a network the firewall is not preventing unauthorized access to, such as the Internet.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The sequence of instructions implemented in a particular data structure or program module represents examples of corresponding acts for implementing the functions or steps described herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB) A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 36*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used. In this description and in the following claims, a "computer" is defined as a general purpose or special purpose computer or any other computing device including, but not limited to, various computer hardware components such as those illustrated in FIG. 1. A "computer system" is defined as a group of one or more computers that interact to perform one or more functions. A "client system" is defined as a computer system, group of computer systems, other devices that might be associated with a network system, or combination thereof, that use the services of another computer system. A "server system" is defined as a computer system, group of computer systems, other devices that might be associated with a network system, or combination thereof, that provide services to another computer system. A "network system" is defined as a plurality of interconnected computer systems and other network devices capable of being interconnected to computer systems.

Note that a computer system may use the services of another computer system and yet still provide services to other computer systems. Thus, a client system in one context may also be a server system in another context. Similarly, a server system in one context may also be a client system in another context. This principal is applicable to all embodiments of the present invention.

Figure 2:
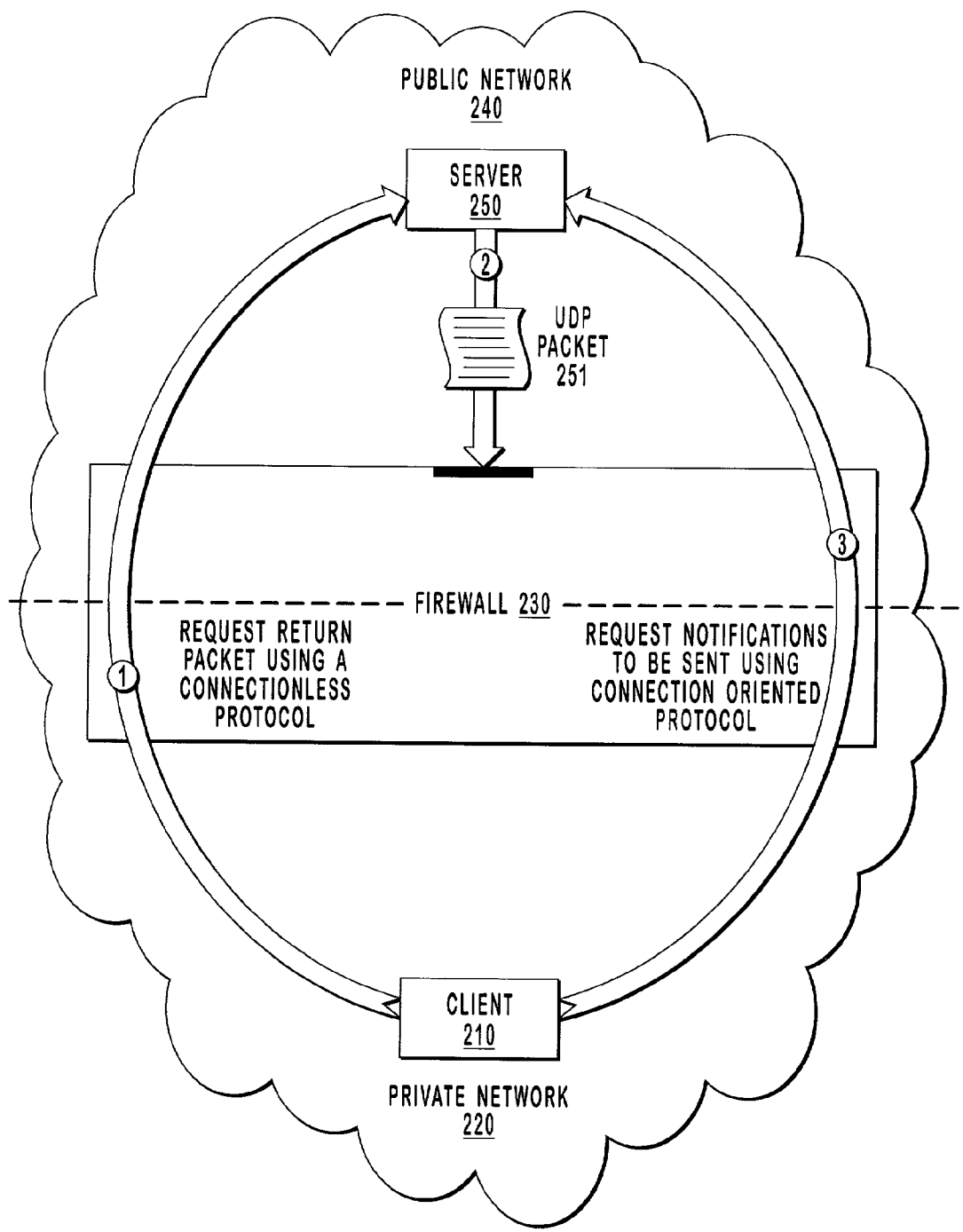
FIG. 2 illustrates some of the functional components present in a system where a client system may determine what type of protocol to use to receive notifications.

FIG. 2 illustrates a network configuration suitable for implementing the principles of the present invention. The configuration includes client system 210, private network 220, firewall 230, public network system 240, and server system 250. Although only one server system and one client system are illustrated in FIG. 2, the general principals disclosed herein can be readily adapted to configurations having any number of client systems and server systems in combination. The private network system 220 includes the client 210 and is in communication with the firewall 230. The public network system 240 includes the server 250 and is also in communication with the firewall 230. Network configurations for private network system 220 include, but are not limited to, Ethernet, token ring, Arcnet, or any other network configuration or combination thereof. Public Network 240 can be any of these configurations, including the Internet.

Firewall 230 prevents communications from entering private network 220 based on security criteria. For example, the firewall 230 may prohibit any UDP packets from entering into the private network 220. The server 250 monitors for the occurrence of events and may dispatch notification to the client 210 once a monitored event occurs. The client 210 ideally receives the dispatched notification In operation, client 210 requests, at some time before the notification of an event might occur, that server 250 send client 210 a packet using a connectionless protocol. Client 210 may make such a request when initially configured or when client 210 detects that network configurations changed. For example, client 210 may request that the server 250 send a UDP packet. The request would pass over private network 220, through firewall 230, over public network 240 and be received by server 250. While the client 210 is requesting a UDP packet in return, the protocol used to make the request is not limited to UDP. Client system 220 can make the request using any protocol it is enabled to use, including, but not limited to, TCP. After sending the request for a UDP packet, client 210 would then attempt to receive a UDP packet from the server 250.

Server system 250 receives the request and transmits UDP packet 251 to client 210. UDP packet 251 would travel across public network system 240. However, when UDP packet 251 reached firewall 230, firewall 230 would typically prevent the packet from passing though and entering private network 220. Since client 210 will not receive UDP packet 251, due to firewall 230 preventing it from entering private network 220, it is determined that receiving notification using UDP is not viable.

This is advantageous because client 210 is made aware that it cannot receive notifications using UDP before any notifications are actually sent. After client 210 determines it cannot receive notifications using UDP, it can request server 250, or any other server, to use other methods (such as TCP) to notify client 210 of the occurrence of an event. This reduces the chance that client 210 will not receive notification of the occurrence of an event for which it has requested notification. In addition, the client 210 may poll the server 250 using TCP for event notifications rather than having the server 250 send notifications as they occur.

As stated above, it may be the case that client 210 sends a request for a packet using a connectionless protocol when network configurations change. In FIG. 2, if client 210 initially determined that if would receive event notifications using TCP, the removal of firewall 230 might change the methods that are available. The discovery mechanism of the current invention is completely dynamic, so that client 210 may receive notifications using TCP when firewall 230 is attached to network 220. However when firewall 230 is removed, client 210, without restarting, or performing any manual steps, re-connects to server 250, and automatically shifts to receiving notifications using UDP.

Figure 3:
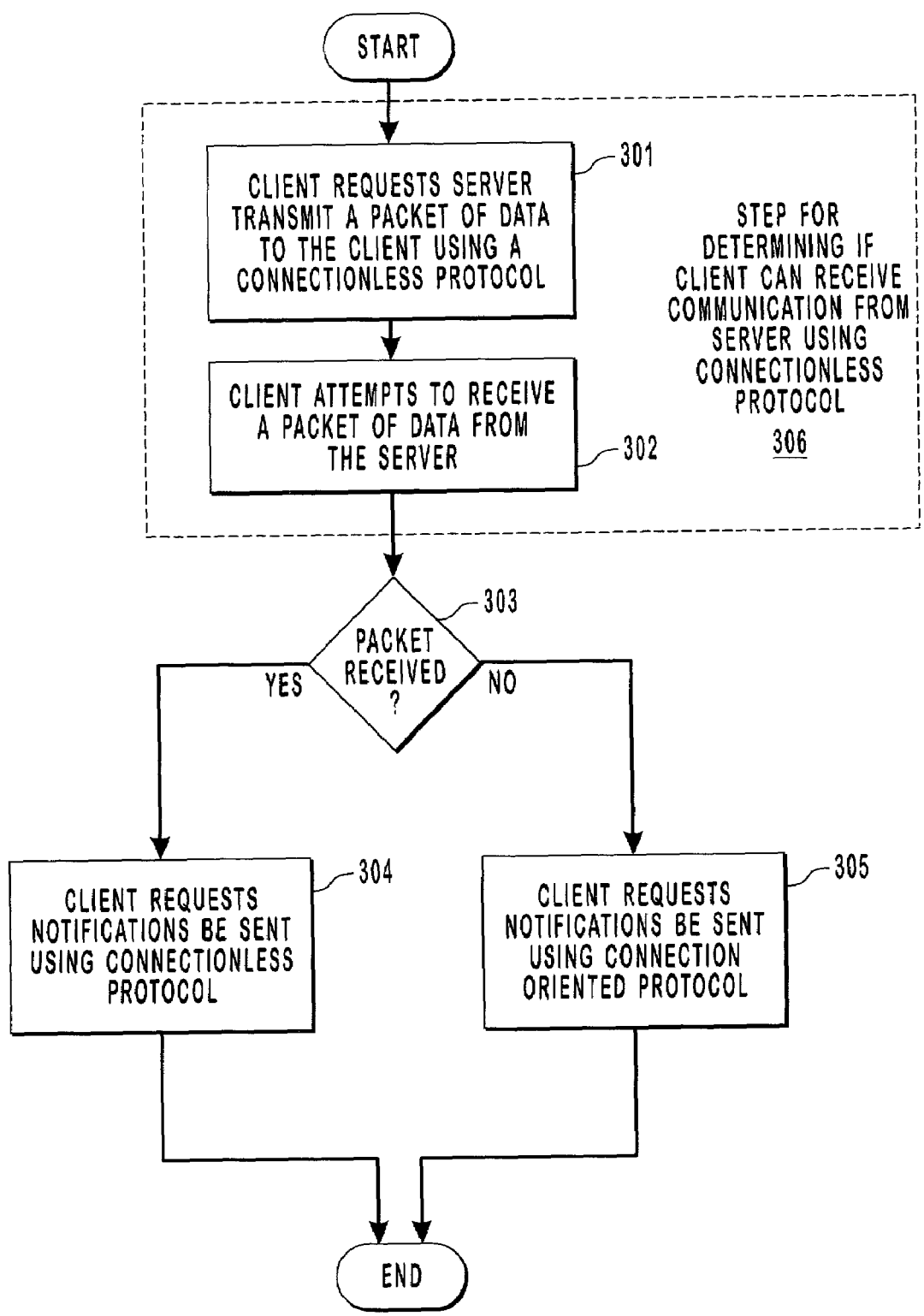
FIG. 3 is a flow diagram illustrating a method whereby a client system determines whether to use a connectionless or connection-oriented protocol to receive notifications.

The operation of the structure of FIG. 2 will now be described with respect to FIG. 3, which is a flowchart of a client system operation when it is determined the client is to receive notifications. The client begins by performing the step for determining if it can receive communication from a server system using a connectionless protocol (step 306). In one embodiment, this may include the client requesting that the server send it a packet of data using the connectionless protocol (act 301) and then attempting to receive a packet of data from the server (act 302).

If the client does receive a packet of data form the server (YES in decision box 303), it is determined that receiving notifications can take place using the connectionless protocol, such as UDP (act 304). In this embodiment, either there is no firewall or any associated firewalls allow UDP packets to enter the private network. Since UDP packets enter the private network, it is possible for the client to receive UDP packet notification. Once the client receives a return UDP packet, it may request the server to send notification of the occurrence of events using UDP. Alternatively, the server 250 may be configured to send notification via UDP packets by default in which case no such express request would be required. In the alternative case, the absence of an express request to use a protocol other than UDP may be considered to be an implicit request to continue using UDP for notification.

This embodiment has the advantage of using the connectionless protocol UDP to send notifications. Since UDP is a connectionless protocol, even repeatedly notifying the client of the occurrence of the same event takes minimal bandwidth and consumes minimal processor resources.

However, if the client does not receive a packet of data from the server (NO in decision box 303), for instance due to a firewall, it is determined that receiving notifications should take place using a connection-oriented protocol, such as TCP (act 305). In one embodiment, where notifications are sent using TCP, a server stores data associated with the occurrence of an event. Then, at time intervals, the client system polls the server to access the data associated with the occurrence of the event. Since TCP is a connection-oriented protocol, this polling method has the advantage of conserving bandwidth on both associated public and private networks and on the processor resources of the client and server systems.

If a client were to receive a TCP connection from a server on every recurrence of every event, it would in some instances simply be notifying the client the occurrence events the client is already aware of. Since the client is receiving redundant notifications the verification algorithms and sequencing algorithms inherent in TCP consume bandwidth and processor resources needlessly.

So whether a UDP packet is received by the client or not, the most efficient protocol is used in the given situation and the characteristics of the chosen protocol are used to deliver notification in a manner that preserves network bandwidth and processor resources The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network system including a server system, a client system and a firewall wherein the server system monitors the occurrence of events, sends notification through the firewall to the client system after one of the monitored events occurs, a method for efficiently notifying the client system of the occurrence of a monitored event, so as to provide notification in a manner preserving the processing capacity of the server system and the client system, and preserving bandwidth on the network system, the method comprising:

an act of the client system sending a request to the server system, wherein the request is that the server system transmit a packet of data containing notification of the occurrence of an event to the client system using a connectionless protocol, wherein the connectionless protocol does not require a session be established between the client system and the server system in order for communication to occur between the client system and the server system;

an act of the client system attempting to receive the packet of data containing notification of the occurrence of an event from the server system, wherein the packet of data is sent using the connectionless protocol;

an act of the client system determining, based on the act of attempting to receive the packet of data from the server system, whether or not the client system can receive notifications, generated as the result of the happening of a monitored event, from the server system using a connectionless protocol, an act of the client system requesting that server system initiated notifications be sent using the connectionless protocol, if the attempt to receive the packet of data is successful;

an act of the client system requesting that server system initiated notifications be sent using a connection-oriented protocol, if the attempt to receive the packet of data is not successful, wherein the connection-oriented protocol establishes a session between the client system and the server system in order for communication to occur between the client system and the server system;

an act of the client system detecting changes in firewall configuration including changes indicating that data packets sent via a connectionless protocol are being allowed through the firewall; and upon determining that data packets sent via a connectionless protocol are being allowed through the firewall, an act of the client system automatically shifting to receiving data packets containing event notifications via the connectionless protocol even though a connection-oriented protocol is available.

2. The method as recited in claim 1, wherein the act of the client system requesting server system initiated notifications be sent using a connection-oriented protocol, further comprises an act of the client system attempting to establish a connection to the server system using the connection-oriented protocol.

3. The method as recited in claim 1, wherein the attempt to receive the packet of data is not successful if the packet of data is not received within a prespecified period of time.

4. The method as recited in claim 1, wherein the connection-oriented protocol is the Transmission Control Protocol.

5. The method as recited in claim 1, wherein the connectionless protocol is the User Datagram Protocol.

6. The method as recited in claim 1, wherein the act of the client system requesting that server system initiated notifications be sent using the connectionless protocol comprises an act of making an express request that notifications be sent using the connectionless protocol.

7. The method as recited in claim 1, wherein the server is configured to, by default, send notifications using a connectionless protocol absent any instruction to the contrary, wherein the act of the client system requesting that server system initiated notifications be sent using the connectionless protocol comprises an act of abstaining from making an express request thereby impliedly requesting that server system initiated notifications be sent using the connectionless protocol.

8. The method of claim 1, wherein the act of the client system sending a request to the server system, wherein the request is that the server system transmit a packet of data to the client system using a connectionless protocol comprises sending a message using a connection-oriented protocol.

9. The method of claim 1, wherein the act of the client system sending a request to the server system, wherein the request is that the server system transmit a packet of data to the client system using a connectionless protocol is performed at some time before the notification of an event might occur.

10. In a network system including a server system, a client system and a firewall wherein the server system monitors the occurrence of events, sends notification through the firewall to the client system after one of the monitored events occurs, a method for determining if notification from the server system to the client system is viable, using a connectionless protocol, so as to provide notification in a manner preserving the processing capacity of the server system and the client system, and preserving bandwidth on the network system, the method comprising:

a step for the client system to determine if communication can be received from the server system using the connectionless protocol, wherein the connectionless protocol does not require a session be established between the client system and the server system in order for communication to occur between the client system and the server system;

an act of the client system determining, based on the act of attempting to receive the packet of data from the server system, whether or not the client system can receive notifications, generated as the result of the happening of a monitored event, from the server system using a connectionless protocol, an act of the client system requesting that server system initiated notifications be sent using the connectionless protocol, if the attempt to receive the packet of data is successful;

an act of the client system requesting that server system initiated notifications be sent using a connection-oriented protocol, if the attempt to receive the packet of data is not successful, wherein the connection-oriented protocol establishes a session between the client system and the server system in order for communication to occur between the client system and the server system;

an act of the client system detecting changes in firewall configuration including changes indicating that data packets sent via a connectionless protocol are being allowed through the firewall; and upon determining that data packets sent via a connectionless protocol are being allowed through the firewall, an act of the client system automatically shifting to receiving data packets containing event notifications via the connectionless protocol even though a connection-oriented protocol is available.

11. The method as recited in claim 10, wherein the act of the client system requesting server system initiated notifications be sent using a connection-oriented protocol, further comprises an act of the client system attempting to establish a connection to the server system using the connection-oriented protocol.

12. The method as recited in claim 10, wherein the attempt to receive the packet of data is unsuccessful if the packet of data is not received within a prespecified period of time.

13. The method as recited in claim 10, wherein the connection-oriented protocol is the Transmission Control Protocol.

14. The method as recited in claim 10, wherein the connectionless protocol is the User Datagram Protocol.

15. The method as recited in claim 10, wherein the act of the client system requesting that server system initiated notifications be sent using the connectionless protocol comprises an act of making an express request that notifications be sent using the connectionless protocol.

16. The method as recited in claim 10, wherein the server is configured to, by default, send notifications using a connectionless protocol absent any instruction to the contrary, wherein the act of the client system requesting that server system initiated notifications be sent using the connectionless protocol comprises an act of abstaining from making an express request thereby impliedly requesting that server system initiated notifications be sent using the connectionless protocol.

17. The method as recited in claim 10, wherein the step for the client system to determine if communication can be received from the server system using the connectionless protocol comprises the following:
   an act of the client system sending a request to the server system, wherein the request is that the server system transmit a packet of data to the client system using a connectionless protocol; and
   an act of the client system attempting to receive a packet of data from the server system, wherein the packet of data is sent using a connectionless protocol.

18. A computer product claim for implementing, in a network system including a server system and a client system, wherein the server system monitors the occurrence of events, sends notification to the client system after one of the monitored events occurs, a method for efficiently notifying the client system, so as to provide notification in a manner preserving the processing capacity of the server system and the client system, and preserving bandwidth on the network system, the computer product comprising:
   a computer-readable medium carry computer executable-instructions that, when executed at the client computer, cause the client system to perform the following:
      an act of sending a request to the server system, wherein the request is that the server system transmit a packet of data containing notification of the occurrence of an event to the client system using a connectionless protocol, wherein the connectionless protocol does not require a session be established between the client system and the server system in order for communication to occur between the client system and the server system;
      an act of attempting to receive the packet of data containing notification of the occurrence of an event from the server system, wherein the packet of data is sent using the connectionless protocol;
      an act of the client system determining, based on the act of attempting to receive the packet of data from the server system, whether or not the client system can receive notifications, generated as the result of the happening of a monitored event, from the server system using a connectionless protocol,
      an act of requesting that server system initiated notifications be sent using the connectionless protocol, if the attempt to receive the packet of data is successful;
      an act of requesting that server system initiated notifications be sent using a connection-oriented protocol, if the attempt to receive the packet of data is not successful, wherein the connection-oriented protocol establishes a session between the client system and the server system in order for communication to occur between the client system and the server system;
      an act of the client system detecting changes in firewall configuration including changes indicating that data packets sent via a connectionless protocol are being allowed through the firewall; and
      upon determining that data packets sent via a connectionless protocol are being allowed through the firewall, an act of the client system automatically shifting to receiving data packets containing event notifications via the connectionless protocol even though a connection-oriented protocol is available.

19. The computer product as recited in claim 18, wherein the act of requesting server system initiated notifications be sent using a connection-oriented protocol, further comprises an act of attempting to establish a connection to the server system using the connection-oriented protocol.

20. The computer program product as recited in claim 18, wherein the attempt to receive the packet of data is unsuccessful if the packet of data is not received within a prespecified period of time.

21. The computer program product as recited in claim 18, wherein the connection-oriented protocol is the Transmission Control Protocol.

22. The computer program product as recited in claim 18, wherein the connectionless protocol is the User Datagram Protocol.

23. The computer program product as recited in claim 18, wherein the computer-readable medium comprises one or more physical storage media.

* * * * *